United States Patent
Mo et al.

(10) Patent No.: US 9,740,561 B2
(45) Date of Patent: Aug. 22, 2017

(54) ONE-TIME PROGRAMMABLE MEMORY DEVICE AND METHOD FOR VERIFYING DATA FOR SUCH MEMORY DEVICE

(71) Applicant: MONTAGE TECHNOLOGY (SHANGHAI) CO., LTD., Shanghai (CN)

(72) Inventors: Guobing Mo, Shanghai (CN); Shuna Xu, Shanghai (CN); Cheng-Tie Chen, Shanghai (CN)

(73) Assignee: MONTAGE TECHNOLOGY (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/014,028

(22) Filed: Feb. 3, 2016

(65) Prior Publication Data
US 2017/0132078 A1    May 11, 2017

(30) Foreign Application Priority Data
Nov. 10, 2015   (CN) .......................... 2015 1 0759862

(51) Int. Cl.
*G06F 11/10*   (2006.01)
*G06F 3/06*    (2006.01)

(52) U.S. Cl.
CPC ........ *G06F 11/1076* (2013.01); *G06F 3/0619* (2013.01); *G06F 3/0659* (2013.01); *G06F 3/0679* (2013.01)

(58) Field of Classification Search
CPC ...................................................... G06F 11/104
USPC .................... 714/807, 755, 766, 764, 721
See application file for complete search history.

(56) References Cited

U.S. PATENT DOCUMENTS

| | | | | |
|---|---|---|---|---|
| 8,046,571 B1* | 10/2011 | Feng | ..................... | G06F 21/575 |
| | | | | 713/1 |
| 2013/0151925 A1* | 6/2013 | Leggette | ................. | H04L 67/10 |
| | | | | 714/763 |
| 2015/0113342 A1* | 4/2015 | Jung | ........................ | G11C 8/14 |
| | | | | 714/721 |

* cited by examiner

*Primary Examiner* — Fritz Alphonse
(74) *Attorney, Agent, or Firm* — Jun He Law Offices P.C.; James J. Zhu (57) ABSTRACT

A one-time programmable (OTP) memory device includes a memory array. The memory array includes: a data storage section for storing application data; a verification information section including at least one verification information unit, wherein each verification information unit includes a verification address region for storing verification address information associated with an address of a subject region in the data storage section, and a reference verification data region for storing one or more reference verification data, and wherein each reference verification data is calculated through reference verification calculation on the application data stored in the subject region using a predetermined verification algorithm. The OTP memory device further includes a verification processor for reading the application data from the subject region according to the verification address information, and calculating a self-verification result from the application data stored in the subject region using a selected verification algorithm; and a controller coupled to the memory array and the verification processor, for receiving the self-verification result from the verification processor and comparing the self-verification result with a reference verification data selected from the one or more reference verification data stored in the reference verification data region to obtain a comparison result.

15 Claims, 2 Drawing Sheets

ONE-TIME PROGRAMMABLE MEMORY DEVICE AND METHOD FOR VERIFYING DATA FOR SUCH MEMORY DEVICE

CROSS REFERENCE TO RELATED APPLICATIONS

This application claims priority to Chinese Patent Application Number 201510759862.7 filed on Nov. 10, 2015, the entire content of which is incorporated herein by reference.

TECHNICAL FIELD

The application generally relates to memory technology, and more specifically, to a one time programmable memory device and a method for verifying data for such memory device.

BACKGROUND

In order to satisfy differentiated requirements of different users on the quality and type of television (TV) programs, TV service providers may grant to specific users permissions of viewing certain programs by billing the specific users, which has become one of the most popular TV service operations nowadays. Secure TV boxes are widely used to control the permissions of viewing TV programs. A control module of the secure TV box generally includes a one-time programmable (OTP) memory device to store application data of certain applications. The OTP memory device of the control module of the TV box generally stores three types of data. The first type of data is identical for the OTP memory device of different chips, which includes, for example, an enable bit, a public key, etc. The second type of data may be different for certain bits of the OTP memory devices of different chips, which includes, for example, a chip serial number, a unique key, etc. The third type of data may be random values for certain bits in the OTP memory devices.

For some reasons, a chip with an OTP memory space may be required to undertake a second test or second recording which may generally be operated by an auto-test equipment (ATE). A common test or recording method is to make and record a search database when the ATE records data into the OTP memory space. The search database at least records two kinds of information for each chip: 1) the reference number, which is chip-dependent and may be used for searching the recorded information of the chip in the search database, for example, the personal identity (PID); and 2) the OTP information required for the second test, and it is determined by the requirement of the system whether the OTP information is recorded directly or recorded in an encrypted form due to security consideration.

When it is required to undertake a second test to a memory chip, the ATE machine reads out the PID of the chip, and calculates the OTP information using the same algorithm or directly reads out the OTP information to be verified. The ATE machine searches with the PID in the search database which is created during first recording of the chip, and compares the OTP information with the information stored in the search database, to determine whether the result of the second test for the OTP chip is correct. When it is required to undertake second recording to the chip, the search database can be re-created and updated in a similar manner.

However, the ATE test method described above is complicated, which may increase the difficulty and cost of the ATE test. Therefore, it is necessary to provide an OTP memory device that may simplify the ATE test.

SUMMARY

An objective of the application is to provide a one-time programmable memory device that facilitates the ATE test.

In a first aspect of the application, there is provided a one-time programmable memory device. The memory device comprises a memory array. The memory array comprises a data storage section for storing application data; a verification information section comprising at least one verification information unit, wherein each verification information unit comprises a verification address region for storing verification address information associated with an address of a subject region in the data storage section, and a reference verification data region for storing one or more reference verification data, and wherein each reference verification data is calculated through reference verification calculation on the application data stored in the subject region using a predetermined verification algorithm; and a verification processor for reading the application data from the subject region according to the verification address information, and calculating a self-verification result from the application data stored in the subject region using a selected verification algorithm; and a controller coupled to the memory array and the verification processor, for receiving the self-verification result from the verification processor and comparing the self-verification result with a reference verification data selected from the one or more reference verification data stored in the reference verification data region to obtain a comparison result.

It can be seen that, the one-time programmable memory device of the application is capable of determining whether its data storage function works correctly according to the reference verification data stored therein, without the need of obtaining any reference verification data from an external module. This data verification method is simple and well compatible with existing technology. Moreover, the host control modules or other modules external to the one-time programmable memory device can only obtain the comparison result of the data verification, and these modules cannot obtain the application data stored in the subject region, therefore the one-time programmable memory device has better data security.

In certain embodiments, each verification information unit further comprises an algorithm selection region for storing a verification algorithm identifier indicative of a verification algorithm to be selected; and the controller is further configured to select the verification algorithm for verifying the application data according to the verification algorithm identifier.

In certain embodiments, each verification information unit further comprises a data selection region for storing a reference verification data selection identifier indicative of a reference verification data to be selected from the one or more reference verification data; and the controller is further configured to select the reference verification data according to the reference verification data selection identifier.

In certain embodiments, each verification information unit further comprises a unit control region for storing a unit control identifier indicative of whether the verification information unit is valid or not; and the controller is further configured to determine, according to the unit control identifier stored in each verification information unit, whether to perform self-verification using information stored in the verification information unit.

In certain embodiments, the at least one verification information unit of the verification information section is continuous, and wherein each verification information unit further comprises a verification control region for storing a verification control identifier indicative of whether a storage region is a verification information unit; and the controller is further configured to determine whether to perform self-verification according to the verification control identifier stored in the at least one verification information unit.

In certain embodiments, the verification address information comprises verification starting address information and verification length information.

In certain embodiments, the verification information section further includes a global information unit for storing a starting address unit size and a verification length unit size, and the controller is further configured to determine a verification starting address according to the verification starting address information and the starting address unit size, and determine a verification length according to the verification length information and the verification length unit size, so as to read the application data from the subject region according to the verification starting address and the verification length.

In certain embodiments, the verification information section is located at the start or end of the memory array.

In a second aspect of the application, there is provided a method for performing data verification for a one-time programmable memory device having a memory array. The memory array comprises a data storage section for storing application data; and a verification information section including at least one verification information unit, wherein each verification information unit comprises a verification address region for storing verification address information associated with an address of a subject region in the data storage section and a reference verification data region for storing one or more reference verification data, and wherein each reference verification data is calculated through reference verification calculation on the application data stored in the subject region using a predetermined verification algorithm. The method comprises reading the application data from the subject region according to the verification address information; calculating a self-verification result from the application data stored in the subject region using a selected verification algorithm; and comparing the self-verification result with a reference verification data selected from the one or more reference verification data stored in the reference verification data region to determine the existence of storage failure in the subject region.

In certain embodiments, each verification information unit further comprises an algorithm selection region for storing a verification algorithm identifier indicative of a verification algorithm to be selected; and the method further comprises selecting the verification algorithm for verifying the application data according to the verification algorithm identifier.

In certain embodiments, each verification information unit further comprises a data selection region for storing a reference verification data selection identifier indicative of a reference verification data to be selected from the one or more reference verification data; and the method further comprises selecting the reference verification data according to the reference verification data selection identifier.

In certain embodiments, each verification information unit further comprises a unit control region for storing a unit control identifier indicative of whether the verification information unit is valid or not; and the method further comprises determining, according to the unit control identifier stored in each verification information unit, whether to perform self-verification using information stored in the verification information unit.

In certain embodiments, the at least one verification information unit of the verification information section is continuous, and wherein each verification information unit further comprises a verification control region for storing a verification control identifier indicative of whether a storage region is a verification information unit; and the method further comprises determining whether to perform self-verification according to the verification control identifier stored in the at least one verification information unit.

In certain embodiments, the verification address information also comprises verification starting address information and verification length information.

In certain embodiments, the verification information section further includes a global information unit for storing a starting address unit size and a verification length unit size; and the method further comprises determining a verification starting address according to the verification starting address information and the starting address unit size, and determining a verification length according to the verification length information and the verification length unit size, so as to read the application data from the subject region according to the verification starting address and the verification length.

The foregoing has outlined, rather broadly, features of the present application. Additional features of the present application will be described, hereinafter, which form the subject of the claims of the present application. It should be appreciated by those skilled in the art that the conception and specific embodiments disclosed herein may be readily utilized as a basis for modifying or designing other structures or processes for carrying out the objectives of the present application. It should also be realized by those skilled in the art that such equivalent constructions do not depart from the spirit and scope of the present application as set forth in the appended claims.

BRIEF DESCRIPTION OF THE DRAWINGS

The aforementioned features and other features of the present application will be further described in the following paragraphs by referring to the accompanying drawings and the appended claims. It will be understood that, these accompanying drawings merely illustrate certain embodiments in accordance with the present application and should not be considered as limitation to the scope of the present application. Unless otherwise specified, the accompanying drawings need not be proportional, and similar reference characters generally denote similar elements.

DETAILED DESCRIPTION OF THE PREFERRED EMBODIMENTS

The following detailed description refers to the accompanying drawings as a part of the present application. Unless otherwise stated in the context, similar symbols generally represent similar components in the accompanying figures. The illustrative embodiments described in the detailed description, the accompanying drawings and the claims are not limiting, and other embodiments may be adopted, or modifications may be made without deviating from the spirit and subject of the application. It should be understood that, the various aspects of the application described and graphically presented herein may be arranged, replaced, combined, divided and designed in many different configurations, and these different configurations are implicitly included in the application.

Figure 1:
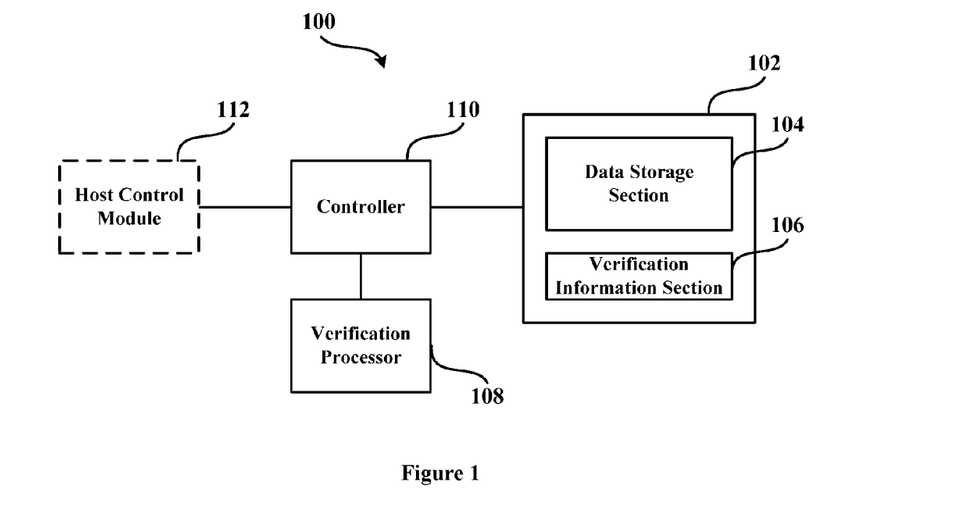
FIG. 1 illustrates a one-time programmable memory device 100 according to an embodiment of the application.

FIG. 1 illustrates a one-time programmable memory device 100 according to an embodiment of the application. In some embodiments, the one-time programmable memory device 100 may be manufactured as a discrete memory chip, or alternatively, may be built into an integrated circuited (IC), such as a system on chip (SOC), functioning as one of its modules for data storage.

As shown in FIG. 1, the one-time programmable memory device 100 includes a memory array 102. The memory array 102 has a plurality of addressable memory cells (not shown) arranged by rows and columns, and each memory cell stores 1-bit data. Each memory cell can be programmed (i.e., written with data) once. Different memory cells may be programmed simultaneously or non-simultaneously. In other words, a part of the memory cells of the memory array 102 may be programmed and the other part of the memory cells may be programmed (which is generally referred to as second programming or second recording) later. In some embodiments, multiple memory cells of the memory 102 may form a word, for example, 32 memory cells may form a word, i.e., the bit-number of a unit word is 32. Accordingly, the number of memory cells included in the memory array 102 is equal to a product of the total number of words of the memory array 102 and the bit-number of the unit word.

The memory array 102 includes a data storage section 104 which stores application data, i.e., data content that a user wants to store. For example, when the memory array 102 is applied in a TV box chip, the application data may include an enable bit, a public key, a chip reference number, a unique key (private key) and so on.

The memory array 102 also includes a verification information section 106 which stores information required for self-verification to the application data stored in the data storage section 104. The self-verification refers to that no reference verification data is required to be obtained externally (for example, from an external database or memory via a host control module 112) by the one-time programmable memory device 100 when determining the existence of storage failure in the subject region, i.e. whether the application data in the subject region is correctly stored, because reference verification data may be stored in the memory array 102 in advance.

Figure 2:
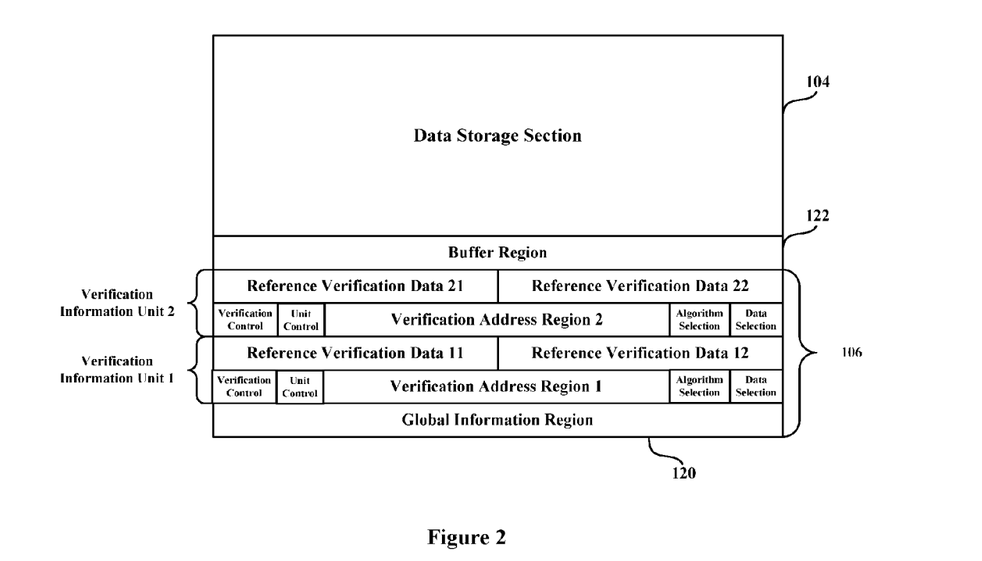
FIG. 2 illustrates an exemplary structure of the memory array shown in FIG. 1.

FIG. 2 illustrates an exemplary structure of the memory array shown in FIG. 1. Each row of the memory array represents a word. It should be readily appreciated that the example shown in FIG. 2 is merely used to describe an exemplary structure of the memory array and is not restrictive of the invention.

As shown in FIG. 2, the memory array includes the data storage section 104 and the verification information section 106. The verification information section 106 includes at least one verification information unit. Each verification information unit is used to instruct to verify the application data stored in a specific region of the data storage section 104. In the embodiments shown in FIG. 2, each verification information unit occupies a two-word memory space. It should be appreciated that in some other embodiments, each verification information unit may occupy one or more words. Moreover, it should be noted that, the partitioning of the data storage section 104 and the verification information section 106 generally depends on the data stored therein and associated storage protocol, while the physical structure and arrangement of the memory cells in these two sections are generally the same.

In particular, each verification information unit may include a verification address region for storing verification address information associated with an address of a subject region. In some embodiments, the verification address information may include a verification starting address and a verification end address, a verification starting address and a verification length, or a verification end address and a verification length. In some other embodiments, the verification information may be information used to calculate or determine the verification starting address, the verification end address and/or the verification length. For example, the verification address information may include a verification starting word number, a verification end word number and/or a verification length. Moreover, the verification information section may also provide a region, such as a global information unit 120 shown in FIG. 2, for storing a starting address unit size and/or a verification length unit size, i.e. the size of a unit word which corresponds to the verification starting word number, the verification end word number and/or the verification length. For example, the verification starting address may be equal to a product of the verification starting word number and the size of the unit word. The verification length may be equal to a product of the verification word length and the size of the unit word. Setting the verification address information in this manner may reduce occupation to the memory space of the memory array by the verification address information, especially when the memory array includes many verification information units.

Each verification information unit also includes a reference verification data region which stores one or more reference verification data, and each reference verification data is calculated through reference verification calculation on the application data stored in the subject region using a predetermined verification algorithm. For example, during first recording to the data storage section, data may be written into the subject region of the data storage section. At the same time, the verification data may be calculated by performing the verification calculation using the predetermined verification algorithm. Thus, the calculated verification data may be written into the reference verification data region as the reference verification data. Depending on the size of the verification data region, one or more reference verification data may be written into the reference verification data region. For example, as shown in FIG. 2, reference verification data 11 is written into the verification information unit 1 during the first recording, and the reference verification data 12 is written into the verification information unit 1 during second recording. Certain bits of the subject region may be updated during the second recording. For example, data stored in the data storage section and the verification information unit may be updated. Thus, it is required to provide updated reference verification data 12. It should be appreciated that in some other embodiments, the reference verification data region may store three or more reference verification data or store only one reference verification data.

Still with reference to FIG. 1, the one-time programmable memory device 100 also include a verification processor 108 which reads the application data from the subject region according to the verification address information stored in the verification information section 106, and calculates a self-verification result from the application data stored in the subject region using a selected verification algorithm. According to the requirement of specific applications, the verification processor 108 may implement various data verification algorithms, such as the CRC16 algorithm, CRC32 algorithm, MD5 algorithm, signature algorithm and the like.

The one-time programmable memory device 100 also includes a controller 110, which is coupled to the memory array 102 and the verification processor 108. The controller 110 receives the self-verification result from the verification processor 108, and compares the self-verification result with a reference verification data selected from the one or more reference verification data stored in the reference verification data region to obtain a comparison result. The controller 110 then outputs the comparison result. It should be appreciated that the predetermined verification algorithm for the calculation of the reference verification data is the same as that for the calculation of the self-verification result. Accordingly, the comparison result indicates whether there is storage failure in the subject region, i.e. whether the application data stored in the subject region is correct or not. If the self-verification result is the same as the reference verification data, then the storage function of the application data is correct and reliable. On the contrary, if the self-verification result is different from the reference verification data, then it may be determined that the memory device 100 does not work correctly. As shown in FIG. 1, the controller 110 is also coupled to the host control module 112 such as a CPU, to provide the comparison result to the host control module 112.

It can be seen that, the one-time programmable memory device 100 is capable of determining whether its data storage function works correctly according to the reference verification data stored therein, without the need of obtaining any reference verification data from an external module. This data verification method is simple and well compatible with existing technology. Moreover, the host control modules or other modules external to the one-time programmable memory device 100 can only obtain the comparison result of the data verification, and these modules cannot obtain the application data stored in the subject region, therefore the one-time programmable memory device has better data security.

In the embodiment shown in FIG. 1, the memory array 102 is coupled to the verification processor 108 through the controller 110 for data communication. In some other embodiments, the memory array 102 may be directly coupled to the verification processor 108, rather than through the controller 110. In this case, the controller 110 may send a verification instruction to the verification processor 108, instructing the verification processor 108 to read data from the memory array 102 for data verification. Then, the controller 110 may receive the self-verification result from the verification processor 108.

Still with reference to FIG. 2, as described above, the reference verification data region of a verification information unit may store only one reference verification data so that the controller may compare the self-verification result with this reference verification data. In some other embodiments, the reference verification data region of a verification information unit may store a plurality of reference verification data which may be reference data calculated from the data written into the subject region during the first recording, the second recording or other subsequent recording respectively. Thus, at least one of the plurality of reference verification data may correspond to the latest data written into the one-time programmable memory device. Under such condition, the controller may read all the reference verification data, and compare them with the self-verification result to obtain a plurality of comparison results. If one of the plurality of comparison results indicates that the self-verification result is consistent with one of the plurality of reference verification data, it is generally determined that the self-verification result is the same as the latest reference verification data, and thus it is determined that the one-time programmable memory device does not have failures in storage function.

Alternatively, the controller may select one reference verification data from the plurality of reference verification data stored in the reference verification data region and compare it with the self-verification result. If the self-verification result is the same as the selected reference verification data, then it can be determined that no storage failure exists. Accordingly, each verification information unit may include a data selection region which stores a reference verification data selection identifier. The reference verification data selection identifier indicates the reference verification data to be selected from the plurality of reference verification data. For example, the verification information unit 1 shown in FIG. 2 stores reference verification data 11 and reference verification data 12, then a one-bit reference verification data selection identifier may be stored in the data selection region. The controller may read the reference verification data selection identifier of the reference verification data and select the corresponding reference verification data according to the value of the reference verification data selection identifier. For example, if the value of the reference verification data selection identifier is "0", the controller may select the reference verification data 11, and if the value of the reference verification data selection identifier is "1", the controller may select the reference verification data 12. By identifying the reference verification data selection identifier of the reference verification data, the controller only compare the self-verification result with the reference verification data once, and thus it is more efficient.

The reference verification data stored in each verification information unit is calculated using a predetermined verification algorithm during data recording of the memory device. Therefore, in the case that the reference verification data stored in different verification information units are calculated using different verification algorithms, the verification information units may also include an algorithm selection region. The algorithm selection region is used to store a verification algorithm identifier indicative of the verification algorithm used in calculating the reference verification data. Accordingly, during the self-verification process, the controller or the verification processor may read the verification algorithm identifier from the verification information unit and select a verification algorithm according to the verification algorithm identifier, so as to calculate the self-verification result from the application data read from the subject region. For example, the verification algorithm identifier may be a 3-bit data which indicates at most 8 types of verification algorithms. According to a predefined protocol, when the value of the identifier is "000", the CRC16 algorithm may be selected, and when the value of the identifier is "001", the MD5 algorithm may be selected, and so on.

As described above, the verification information section may include a plurality of verification information units. Each of the verification information units may indicate to verify the application data stored in a specific region of the data storage section. In some embodiments, the controller may read verification information of all verification information units and performs data verification accordingly. In some other embodiments, each verification information unit may also include a unit control region for storing a unit control identifier, and the unit control identifier indicates whether the verification information unit is valid or not. Accordingly, the controller may determine, according to the unit control identifier stored in each verification information unit, whether or not to perform self-verification using information stored in the verification information unit. In other words, if the value of the unit control identifier stored in a verification information unit is valid, then the controller may continue to read other verification information of the verification information unit for data verification. However, if the value of the unit control identifier stored in a verification information unit is invalid, then the controller may not use other information of the verification information unit for data verification. The value of the unit control identifier stored in the unit control region may be set to valid by default. When the second recording is required, according to the verification requirement, for example, when the value in the subject region is modified and there is no remaining space in the verification information unit for storing new reference verification data, or when the verification algorithm is changed, the value of the unit control identifier of the verification information unit may be changed once to invalid so as to abandon the verification information unit. Preferably, the unit control region may be set in the most significant bits or the least significant bits of the verification information unit, such that the unit control identifier can be read prior to the verification address information and/or reference verification data to improve the verification efficiency.

In some embodiments, in order to distinguish the data storage section from the verification information section, each verification information unit may also include a verification control region for storing a verification control identifier. The verification control identifier indicates whether a memory region is a verification information unit. The controller may determine whether self-verification is required according to the verification control identifier. For example, the verification control identifier may be 1-bit data indicative of the validity of self-verification. For example, a value of "1" indicates that a memory region is a verification information unit and thus self-verification is required, and a value of "0" indicates that the memory region is not a verification information unit and thus no self-verification is required. The verification information units in the verification information section may be continuous, for example, located at the starting position or the end position of the memory array. For example, in the example shown in FIG. 2, the values of the most significant bit (MSB) of the verification information unit 1 and the verification information unit 2 are "1". When the controller is reading the memory array, the controller may find that the values of the MSB of the two verification information units 1 and 2 are "1", then the controller may determine that the self-verification is required. On the contrary, the value of the MSB of a buffer region adjacent to the verification information unit 2 is "0". Accordingly, when the controller reads out the value "0", it may stop the self-verification process. In some embodiments, the value of the verification control identifier is set to "0", i.e., invalid, by default. Only when a new verification information unit is added, the value of the verification control identifier is then modified to "1", i.e., valid, to indicate the corresponding verification operation. Preferably, in the case that the unit control regions are set in the most significant bits of the verification information units, the verification control regions may also be set in the most significant bits of the verification information units, for example, before the respective unit control regions, so as to improve the verification efficiency.

Figure 3:
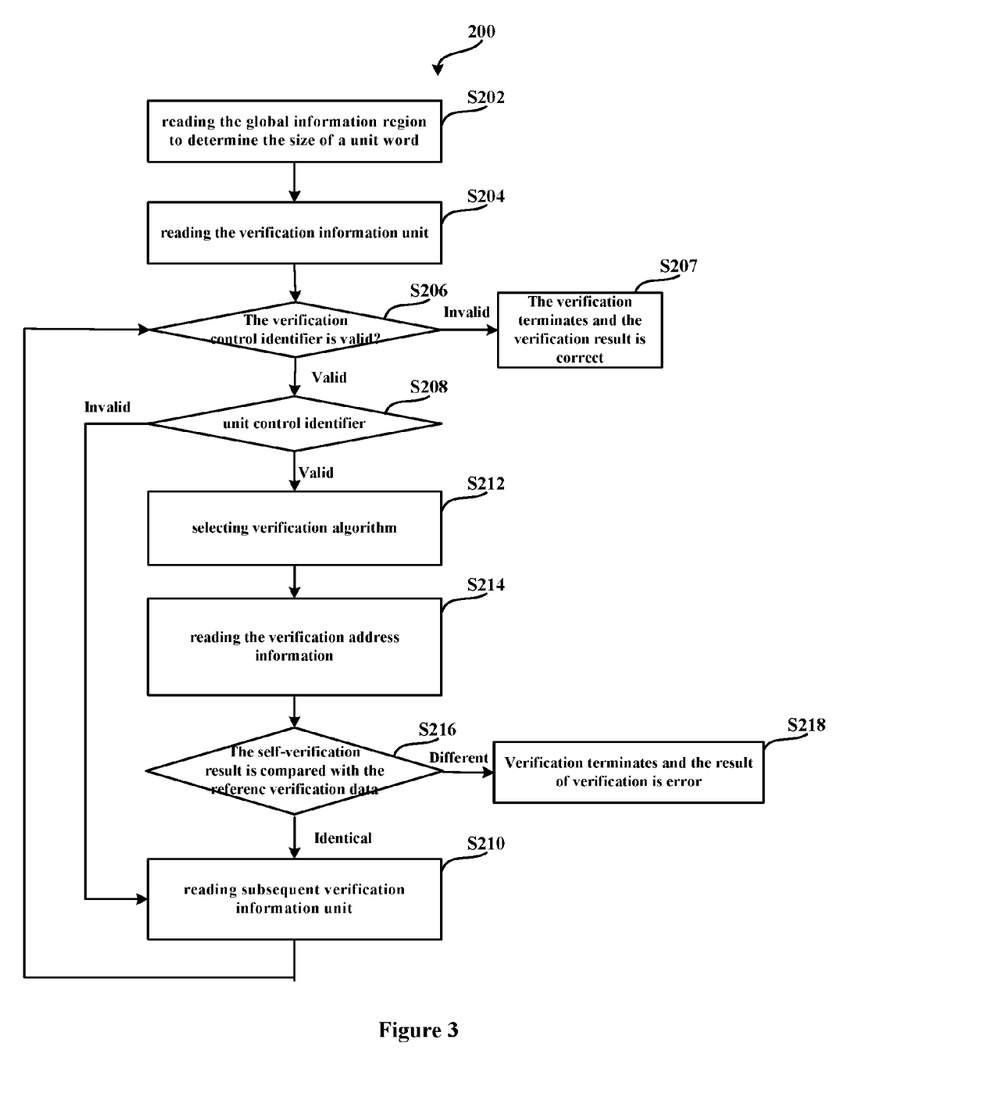
FIG. 3 illustrates a method for verifying a one-time programmable memory device according to an embodiment of the application.

FIG. 3 illustrates a method for verifying data for a one-time programmable memory device according to an embodiment of the application. The method 200 can be used to verify the one-time programmable memory device shown in FIGS. 1 and 2. In the following, the steps of the method 200 will be described in detail with reference to FIGS. 1 to 3.

First, an auto-test equipment or a host control module sends out an instruction, and the controller initiates data verification in response to the instruction.

Then, the controller reads the verification information section and starts the data verification. In some embodiments, after reading a verification information unit in the verification information section, the controller may immediately control the verification processor to perform the verification calculation and data comparison according to verification information stored in the verification information unit. In other embodiments, the controller may perform the verification calculation after reading all of the verification information units included in the verification information section.

Specifically, in step S202, the controller reads a global information unit to determine the size of a unit word for a verification starting byte number, a verification end byte number and/or a verification word length.

In step S204, the controller reads one or more verification information units, for example, the verification information unit 1 and/or verification information unit 2 shown in FIG. 2, to obtain various verification information stored therein.

For each verification information unit, in step S206, the controller determines whether the verification control identifier stored in the verification control region is valid or not. If the verification control identifier is invalid, then in step S207, the verification process terminates and the verification result indicative of non-existence of storage failure may be returned. Since the verification identifier being invalid (i.e. its value is "0") indicates that the memory region is not a verification information unit, the verification result indicative of non-existence of storage failure may be returned without executing self-verification, so that the controller or other control devices may continue to perform other operations on the one-time programmable memory device. In some embodiments, some one-time programmable memory devices have not been written with any verification data, and thus do not require self-verification. Therefore, when the verification information unit is initially read, the value of the verification identifier obtained is invalid. In some embodiments, an invalid value of the verification control identifier indicates that there is no verification information unit in the subsequent region, and then the controller may terminate the verification and return the verification result immediately. If the value of the control identifier is valid, then in step S208, the controller determines whether the unit control identifier stored in the unit control region is valid or not. If the unit control identifier is invalid, then in step S210, verification information in the subsequent verification information unit is read out by the controller. If the unit control identifier is valid, then in step S212, the verification processor selects a corresponding verification algorithm according to the verification algorithm identifier stored in the algorithm selection region. Next, in step S214, according to the verification address information stored in the verification address region, the application data stored in the data storage section is read out and provided to the verification processor to calculate the self-verification result. After that, in step S216, the controller selects a corresponding reference verification data from the verification information unit according to the reference verification data selection identifier, and compares it with the self-verification result. If the comparison result indicates consistence between these data, then in step S210, the verification information of the subsequent verification information unit is read out. However, if the comparison result indicates inconsistence, then in step S218, the verification process is terminated and the controller may return a result indicative of the existence of storage failure to the host control module. It should be appreciated that, if the verification information section includes a plurality of reference verification data without a reference verification data selection identifier, then in step S216, the controller may compare the plurality of the reference verification data with the self-verification result. When the self-verification result is different from all of the plurality of the reference verification data, then the process may go to step S218; and when the self-verification result is the same as one of the plurality of the reference verification data, then the process may go to step S210.

Therefore, according to the verification result returned by the controller, the host control module may determine whether there is storage failure in the data stored in the one-time programmable memory device, without the need of providing any reference verification data. This data verification method is simple and has good compatibility.

The one-time programmable memory device of the application is especially suitable for conditions that second recording or $N^{th}$ recording is required.

Specifically, before the second recording, a portion of the data storage section of the one-time programmable memory device may be written with application data. Accordingly, the verification information section of the memory device is written with corresponding verification information. For example, as shown in FIG. 2, the verification address region 1 of the verification information unit 1 is written with verification address information indicative of the address of a subject region of the data storage section. Moreover, the algorithm selection region of the verification information unit 1 is written with a corresponding verification algorithm identifier, and the reference verification data 11 shown in FIG. 2 is also written into the verification information unit 1.

Therefore, before the second burning, the ATE machine may first check whether the storage function of the memory device is normal, for example, the process shown in FIG. 3 may be used to do the verification. Specifically, the ATE machine may read the verification address information to further read the application data stored in the corresponding region of the data storage section, and calculate the self-verification result using the verification algorithm corresponding to the verification algorithm identifier. Then, the ATE machine reads the reference verification data and compares the self-verification result with the reference verification data. If the comparison result shows that the two are identical, then the ATE machine may proceed with the second recording.

In some cases, only a few data modifications may be made during the second recording, for example, when new data may be written into the storage region addressable by the verification address information that have already been written into the verification address region 1, the ATE machine may read all the application data from the addressable storage region, calculate a new reference verification using the original verification algorithm, and write the new reference verification data into the verification information unit 1 as the reference verification data 12. Accordingly, the value of the reference verification data selection identifier of the verification information unit 1 may be modified to indicate such update of the reference verification data, i.e., indicate that the valid reference verification data after the second recording changes from the reference verification data 11 to the reference verification data 12. When the ATE machine performs data verification again to the memory device after the second recording, as described in the process of FIG. 2, the ATE machine may select the reference verification data 12 for self-verification according to the updated value of the reference verification data selection identifier.

In some other cases, a great amount of data modifications may be made during the second recording, for example, most of the data storage section may be written with new data. Thus, the verification address information stored in the verification information unit 1 cannot reflect such data modification. Under such condition, it may be required to enlarge the range of the subject region, and accordingly, the verification address information may need an update. Since the verification address region 1 in the verification information unit 1 has been used, it is required to add a new verification information unit 2 and write the new verification address information into the verification address region 2. Accordingly, the new verification address data 21 may be written into the verification information unit 2. Since the verification information stored in the original verification information unit 1 may not be used, the unit control identifier in the unit control region of the verification information unit 1 may be modified to invalid, and the newly added unit control identifier of the verification information unit 2 may be set to valid. Therefore, when the ATE machine performs data verification on the memory device after the second recording, as described above in the flowchart of FIG. 2, it will select the reference verification data 21 for self-verification according to the unit verification identifiers of the verification information units.

In some circumstances, a new verification algorithm may be used due to various reasons. Then, the verification information stored in the original verification information unit 1 cannot be used as well. Similarly, the verification information unit 1 may be abandoned and one or more verification information unit may be added to update the verification algorithm and the corresponding reference verification data. Accordingly, during the second recording, data verification may be performed according to the updated verification information to determine whether there is storage failure in the memory device.

Those skilled in the art may understand and implement other variations to the disclosed embodiments from a study of the drawings, the disclosure, and the appended claims. In the claims, the word "comprising" does not exclude other elements or steps, and the indefinite article "a" or "an" does not exclude a plurality. In applications according to present application, one element may perform functions of several technical feature recited in claims. Any reference signs in the claims should not be construed as limiting the scope. The scope and spirit of the present application is defined by the appended claims.

What is claimed is:

1. A one-time programmable (OTP) memory device, comprising:
   a memory array, comprising:
      a data storage section for storing application data;
      a verification information section comprising at least one verification information unit, wherein each verification information unit comprises a verification address region for storing verification address information associated with an address of a subject region in the data storage section, and a reference verification data region for storing one or more reference verification data, and wherein each reference verification data is calculated through reference verification calculation on the application data stored in the subject region using a predetermined verification algorithm;
   a verification processor for reading the application data from the subject region according to the verification address information, and calculating a self-verification result from the application data stored in the subject region using a selected verification algorithm; and
   a controller coupled to the memory array and the verification processor, for receiving the self-verification result from the verification processor and comparing the self-verification result with a reference verification data selected from the one or more reference verification data stored in the reference verification data region to obtain a comparison result.

2. The one-time programmable memory device of claim 1, wherein each verification information unit further comprises an algorithm selection region for storing a verification algorithm identifier indicative of a verification algorithm to be selected; and
   the controller is further configured to select the verification algorithm for verifying the application data according to the verification algorithm identifier.

3. The one-time programmable memory device of claim 1, wherein each verification information unit further comprises a data selection region for storing a reference verification data selection identifier indicative of a reference verification data to be selected from the one or more reference verification data; and
   the controller is further configured to select the reference verification data according to the reference verification data selection identifier.

4. The one-time programmable memory device of claim 1, wherein each verification information unit further comprises a unit control region for storing a unit control identifier indicative of whether the verification information unit is valid or not; and
   the controller is further configured to determine, according to the unit control identifier stored in each verification information unit, whether to perform self-verification using information stored in the verification information unit.

5. The one-time programmable memory device of claim 1, wherein the at least one verification information unit of the verification information section is continuous, and wherein each verification information unit further comprises a verification control region for storing a verification control identifier indicative of whether a storage region is a verification information unit; and
   the controller is further configured to determine whether to perform self-verification according to the verification control identifier stored in the at least one verification information unit.

6. The one-time programmable memory device of claim 1, wherein the verification address information comprises verification starting address information and verification length information.

7. The one-time programmable memory device of claim 6, wherein the verification information section further includes a global information unit for storing a starting address unit size and a verification length unit size, and
   the controller is further configured to determine a verification starting address according to the verification starting address information and the starting address unit size, and determine a verification length according to the verification length information and the verification length unit size, so as to read the application data from the subject region according to the verification starting address and the verification length.

8. The one-time programmable memory device of claim 1, wherein the verification information section is located at the start or end of the memory array.

9. A method for performing data verification for a one-time programmable memory device having a memory array, wherein the memory array comprises:
   a data storage section for storing application data;
   a verification information section including at least one verification information unit, wherein each verification information unit comprises a verification address region for storing verification address information associated with an address of a subject region in the data storage section, and a reference verification data region for storing one or more reference verification data, and wherein each reference verification data is calculated through reference verification calculation on the application data stored in the subject region using a predetermined verification algorithm; and
the method comprises:
   reading the application data from the subject region according to the verification address information;
   calculating a self-verification result from the application data stored in the subject region using a selected verification algorithm; and
   comparing the self-verification result with a reference verification data selected from the one or more reference verification data stored in the reference verification data region to determine whether there is storage failure in the subject region.

10. The method of claim 9, wherein each verification information unit further comprises an algorithm selection region for storing a verification algorithm identifier indicative of a verification algorithm to be selected; and the method further comprises:
   selecting the verification algorithm for verifying the application data according to the verification algorithm identifier.

11. The method of claim 9, wherein each verification information unit further comprises a data selection region for storing a reference verification data selection identifier indicative of a reference verification data to be selected from the one or more reference verification data; and the method further comprises:
   selecting the reference verification data according to the reference verification data selection identifier.

12. The method of claim 9, wherein each verification information unit further comprises a unit control region for storing a unit control identifier indicative of whether the verification information unit is valid or not; and the method further comprises:

determining, according to the unit control identifier stored in each verification information unit, whether to perform self-verification using information stored in the verification information unit.

13. The method of claim 9, wherein the at least one verification information unit of the verification information section is continuous, and wherein each verification information unit further comprises a verification control region for storing a verification control identifier indicative of whether a storage region is a verification information unit; and the method further comprises:
   determining whether to perform self-verification according to the verification control identifier stored in the at least one verification information unit.

14. The method of claim 9, wherein the verification address information also comprises verification starting address information and verification length information.

15. The method of claim 9, wherein the verification information section further includes a global information unit for storing a starting address unit size and a verification length unit size; the method further comprises:
   determining a verification starting address according to the verification starting address information and the starting address unit size, and determining a verification length according to the verification length information and the verification length unit size, so as to read the application data from the subject region according to the verification starting address and the verification length.

\* \* \* \* \*